(12) United States Patent
Doi et al.

(10) Patent No.: US 8,760,435 B2
(45) Date of Patent: Jun. 24, 2014

(54) TOUCH PANEL

(75) Inventors: Koji Doi, Chiba (JP); Koji Nagata, Hachioji (JP)

(73) Assignee: Japan Display Inc., Tokyo (JP)

( * ) Notice: Subject to any disclaimer, the term of this patent is extended or adjusted under 35 U.S.C. 154(b) by 141 days.

(21) Appl. No.: 13/558,440

(22) Filed: Jul. 26, 2012

(65) Prior Publication Data
US 2013/0027347 A1    Jan. 31, 2013

(30) Foreign Application Priority Data

Jul. 28, 2011  (JP) .................................. 2011-165355

(51) Int. Cl.
*G06F 3/045* (2006.01)
*G06F 3/041* (2006.01)
*G09G 5/00* (2006.01)

(52) U.S. Cl.
USPC ............ 345/174; 345/156; 345/162; 345/173

(58) Field of Classification Search
USPC .......................................................... 345/174
See application file for complete search history.

(56) References Cited

U.S. PATENT DOCUMENTS

| | | | | |
|---|---|---|---|---|
| 5,565,658 A | * | 10/1996 | Gerpheide et al. | 178/18.02 |
| 5,825,352 A | * | 10/1998 | Bisset et al. | 345/173 |
| 8,154,529 B2 | * | 4/2012 | Sleeman et al. | 345/173 |
| 8,368,657 B2 | * | 2/2013 | Borras | 345/173 |
| 2006/0026521 A1 | * | 2/2006 | Hotelling et al. | 715/702 |
| 2006/0097991 A1 | * | 5/2006 | Hotelling et al. | 345/173 |
| 2009/0049404 A1 | * | 2/2009 | Jung et al. | 715/810 |
| 2009/0174675 A1 | * | 7/2009 | Gillespie et al. | 345/173 |
| 2010/0060609 A1 | * | 3/2010 | Doi et al. | 345/174 |
| 2010/0259504 A1 | * | 10/2010 | Doi et al. | 345/174 |
| 2010/0315372 A1 | * | 12/2010 | Ng | 345/174 |
| 2012/0319994 A1 | * | 12/2012 | Hatano | 345/174 |

FOREIGN PATENT DOCUMENTS

JP    2008-287376    11/2008

* cited by examiner

*Primary Examiner* — Joe H Cheng
*Assistant Examiner* — Benyam Ketema
(74) *Attorney, Agent, or Firm* — Antonelli, Terry, Stout & Kraus, LLP.

(57) ABSTRACT

Provided is a touch panel which completes touch detection within a specified time even when the maximum number of touch points is set to be large. A control portion assigns priorities for being given a high coordinate precision to the respective touch points based on the state of the touch points. The control portion selects coordinate calculation algorithms having coordinate precisions corresponding to the priorities of the respective touch points from among a plurality of coordinate calculation algorithms, and calculates required calculation time for calculating coordinates of all the touch points. The control portion determines the priorities so that the calculated required calculation time is equal to or shorter than a specified time. The control portion selects coordinate calculation algorithms corresponding to the priorities and calculates the coordinates of the respective touch points.

11 Claims, 10 Drawing Sheets

FIG.2

| | X1 | X2 | X3 | X4 | X5 | X6 | X7 | X8 |
|---|---|---|---|---|---|---|---|---|
| Y12 | 0 | 0 | 3 | 4 | 2 | 0 | 0 | 0 |
| Y11 | 0 | 3 | 6 | 7 | 5 | 2 | 0 | 0 |
| Y10 | 0 | 5 | 8 | 9 | 7 | 4 | 0 | 0 |
| Y9 | 0 | 3 | 8 | 7 | 5 | 2 | 0 | 0 |
| Y8 | 0 | 0 | 3 | 4 | 2 | 0 | 0 | 0 |
| Y7 | 0 | 0 | 0 | 0 | 0 | 4 | 6 | 4 |
| Y6 | 0 | 0 | 0 | 0 | 2 | 6 | 8 | 6 |
| Y5 | 0 | 0 | 0 | 0 | 1 | 4 | 6 | 4 |
| Y4 | 0 | 0 | 0 | 0 | 0 | 1 | 2 | 0 |
| Y3 | 3 | 6 | 4 | 0 | 0 | 0 | 0 | 0 |
| Y2 | 5 | 8 | 6 | 0 | 0 | 0 | 0 | 0 |
| Y1 | 3 | 6 | 4 | 0 | 0 | 0 | 0 | 0 |

| ALGORITHM | REQUIRED TIME | COORDINATE PRECISION |
|---|---|---|
| A | 5ms | ±1mm |
| B | 3ms | ±2mm |
| C | 0ms | ±5mm |

| ITEM | VALUE |
|---|---|
| MAXIMUM NUMBER OF TOUCH POINTS | 10 |
| COORDINATE CALCULATION TIME | 8ms |

| REGION | REQUIRED COORDINATE PRECISION |
|---|---|
| (10,110)-(80,120) | ±2mm |
| (10,10)-(80,30) | ±5mm |

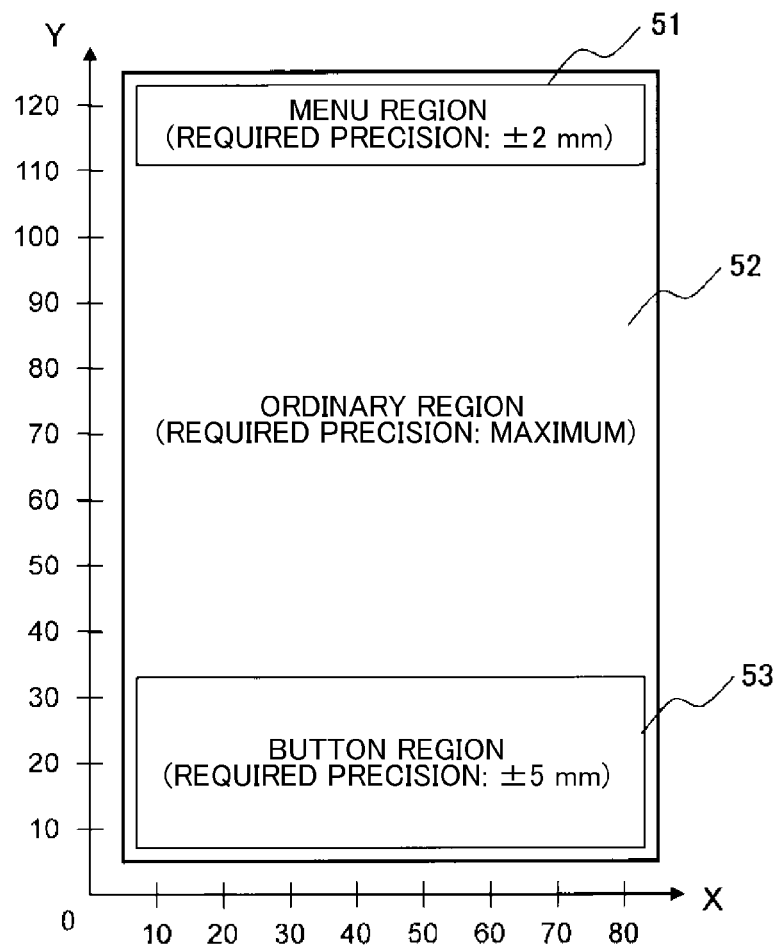

| TOUCH POINT NUMBER | TENTATIVE COORDINATES | REQUIRED COORDINATE PRECISION | GRADE | ALGORITHM |
|---|---|---|---|---|
| 1 | (40, 100) | | | |
| 2 | (70, 60) | | | |
| 3 | (20, 20) | | | |

| TOUCH POINT NUMBER | TENTATIVE COORDINATES | REQUIRED COORDINATE PRECISION | GRADE | ALGORITHM |
|---|---|---|---|---|
| 1 | (40, 100) | MAXIMUM | 1 | |
| 2 | (70, 60) | MAXIMUM | 2 | |
| 3 | (20, 20) | ±5mm | — | |

| TOUCH POINT NUMBER | TENTATIVE COORDINATES | REQUIRED COORDINATE PRECISION | GRADE | ALGORITHM |
|---|---|---|---|---|
| 1 | (40, 100) | MAXIMUM | 1 | A |
| 2 | (70, 60) | MAXIMUM | 2 | A |
| 3 | (20, 20) | ±5mm | — | C |

| TOUCH POINT NUMBER | TENTATIVE COORDINATES | REQUIRED COORDINATE PRECISION | GRADE | ALGORITHM |
|---|---|---|---|---|
| 1 | (40, 100) | MAXIMUM | 1 | A |
| 2 | (70, 60) | MAXIMUM | 2 | B |
| 3 | (20, 20) | ±5mm | — | C |

| TOUCH POINT NUMBER | COORDINATES | COORDINATE PRECISION |
|---|---|---|
| 1 | (38, 102) | ±1mm |
| 2 | (70, 60) | ±2mm |
| 3 | (20, 20) | ±5mm |

TOUCH PANEL

CROSS-REFERENCE TO RELATED APPLICATION

The present application claims priority from Japanese application JP 2011-165355 filed on Jul. 28, 2011, the content of which is hereby incorporated by reference into this application.

BACKGROUND OF THE INVENTION

1. Field of the Invention

The present invention relates to a touch panel, and more particularly, to a touch panel device which completes touch detection within a predetermined time.

2. Description of the Related Art

A display device which includes a device for inputting information by a touch operation (contact press operation; hereinafter, simply referred to as touch) onto a display screen with the use of a user's finger or a pen (hereinafter, the device is referred to also as touch sensor or touch panel) is used for mobile electronic devices such as a PDA and a mobile terminal, various home electric appliances, an automated teller machine, and other such devices. As the touch panel, there are known a resistive type touch panel that detects a change in resistance at a touched portion, a capacitance type touch panel that detects a change in capacitance, and an optical sensor type touch panel that detects a change in light intensity.

The capacitance type touch panel includes a plurality of detection electrodes extending in a vertical direction (X electrodes) and a plurality of detection electrodes extending in a horizontal direction (Y electrodes), and an input processing portion detects interelectrode capacitances between the X electrodes and the Y electrodes that intersect each other. When a conductor such as a finger makes contact with the front surface of the touch panel, the capacitance of an electrode placed at the contact position increases. The input processing portion detects the change in capacitance, and calculates input coordinates (touch point) based on a signal of the capacitance change detected at each electrode.

SUMMARY OF THE INVENTION

However, a conventional touch panel has a problem that touch detection time increases in proportion to the number of touch points.

Therefore, in order to complete the touch detection within a predetermined time even when there are multiple touches simultaneously, it is necessary to set the upper limit of the number of touch points to be detected (maximum number of touch points) to be small (for example, on the order of two to four).

The present invention has been made to solve the problem of the conventional art, and an object of the present invention is to provide a touch panel which completes the touch detection within a predetermined time even when the maximum number of touch points is set to be large.

The above-mentioned and other objects and novel features of the present invention are made clear by the following description of this specification and the accompanying drawings.

Exemplary embodiments of the invention disclosed herein are briefly outlined as follows.

(1) A touch panel includes: a plurality of X electrodes; a plurality of Y electrodes; a measuring portion for measuring interelectrode capacitances between the plurality of X electrodes and the plurality of Y electrodes; a storage portion for storing interelectrode capacitance values between the plurality of X electrodes and the plurality of Y electrodes; and a control portion having a plurality of coordinate calculation algorithms for obtaining different coordinate precisions, for selecting one of the plurality of coordinate calculation algorithms and calculating coordinates of a touch position on the touch panel based on the interelectrode capacitance values stored in the storage portion, in which the control portion includes: first means for detecting touch points on the touch panel based on the interelectrode capacitance values stored in the storage portion and for determining tentative coordinates of the respective detected touch points; second means for assigning priorities for being given a high coordinate precision to the respective touch points based on a state of the touch points; third means for selecting coordinate calculation algorithms corresponding to the priorities assigned by the second means to the respective touch points and for estimating a calculation time necessary for calculating the coordinates of all the touch points detected; fourth means for determining whether the calculation time estimated by the third means is within a specified time or not; fifth means for, when the fourth means determines that the calculation time estimated by the third means is not within the specified time, causing the third means to again select coordinate calculation algorithms and estimate the calculation time; and sixth means for, when the fourth means determines that the calculation time estimated by the third means is within the specified time, selecting, based on the priorities assigned by the second means, coordinate calculation algorithms corresponding to the priorities and for calculating the coordinates of the respective touch points.

(2) In the touch panel according to the above-mentioned item (1): the storage portion includes algorithm information for storing a list of the plurality of coordinate calculation algorithms, required times when calculation is performed using the coordinate calculation algorithms, and obtained coordinate precisions; and the third means of the control portion refers to the algorithm information, selects the coordinate calculation algorithms corresponding to the priorities, and determines the calculation time necessary for calculating the coordinates of all the touch points.

(3) In the touch panel according to the above-mentioned item (1): the storage portion includes a touch detection setting for storing a maximum number of touch points that is an upper limit of a number of touch points for which coordinate calculation is performed and a coordinate calculation time allowed in touch detection processing when there are a plurality of touches simultaneously; the first means of the control portion discontinues detection of the touch points when a total number of detected touch points exceeds the maximum number of touch points stored in the touch detection setting; and the fourth means of the control portion uses as the specified time the coordinate calculation time stored in the touch detection setting.

(4) In the touch panel according to the above-mentioned item (3), the maximum number of touch points and the coordinate calculation time stored in the touch detection setting can be set from outside of the touch panel.

(5) In the touch panel according to the above-mentioned item (1): the storage portion includes a region setting for storing a specific region on the touch panel and coordinate precision required in the specific region; and the second means of the control portion assigns, as the priority assigned to a touch point in the specific region stored in the region setting, a priority corresponding to the coordinate precision of the specific region.

(6) In the touch panel according to the above-mentioned item (5), the specific region and the coordinate precision of the specific region stored in the region setting can be set from outside of the touch panel.

(7) In the touch panel according to the above-mentioned item (1), the second means of the control portion first assigns the priorities for being given a highest coordinate precision to the respective touch points, and, when the second means of the control portion again assigns the priorities to the respective touch points based on a result of the determination by the fourth means, gives a high grade to a specific touch point and gives a low grade to other touch points.

(8) In the touch panel according to the above-mentioned item (7), when the second means of the control portion again assigns the priorities to the respective touch points based on the result of the determination by the fourth means, the second means gives a high grade to a touch point having a low moving rate and gives a low grade to a touch point having a high moving rate.

(9) In the touch panel according to the above-mentioned item (1): the storage portion includes a touch point administration table for storing, for each of the touch points detected by the first means of the control portion, tentative coordinates, a required coordinate precision, a grade, and a coordinate calculation algorithm of the each touch point; and the touch point administration table stores values obtained by the first means and the second means of the control portion as items.

(10) In the touch panel according to the above-mentioned item (1): the storage portion includes a touch detection result for storing, for each of the touch points detected by the first means of the control portion, coordinates and a coordinate precision of the each touch point; and the touch detection result stores values obtained by the first means and the sixth means of the control portion as items.

(11) In the touch panel according to the above-mentioned item (1), the control portion notifies outside of the coordinates and the coordinate precision of the touch point for the each of the touch points detected by the first means.

BRIEF DESCRIPTION OF THE DRAWINGS

In the accompanying drawings:

FIG. 2 is a schematic view showing a structure and an exemplary set of values of signal values illustrated in FIG. 1;

FIG. 3 is a schematic view showing items and an exemplary set of values of algorithm information illustrated in FIG. 1;

FIG. 4 is a schematic view showing items and an exemplary set of values of a touch detection setting illustrated in FIG. 1;

FIG. 5 is a schematic view showing items and an exemplary set of values of a region setting illustrated in FIG. 1;

FIG. 6 is a schematic view showing an exemplary user interface;

FIG. 7 is a schematic view showing items of a touch point administration table illustrated in FIG. 1;

FIG. 12 is a schematic view showing an exemplary touch point administration table in Step S2 in FIG. 8;

FIG. 13 is a schematic view showing an exemplary touch point administration table in Step S3 in FIG. 8;

FIG. 14 is a schematic view showing an exemplary touch point administration table in Step S4 in FIG. 8;

FIG. 15 is a schematic view showing an exemplary touch point administration table in Step S5 in FIG. 8;

FIG. 16 is a schematic view showing items and an exemplary set of values of a touch detection result in the touch panel according to the embodiment of the present invention.

DETAILED DESCRIPTION OF THE INVENTION

Hereinafter, an embodiment of the present invention is described in detail with reference to the accompanying drawings.

Note that, throughout the drawings illustrating the embodiment, the same reference symbol is given to components having the same function, and repeated description thereof is omitted. Also note that, the following embodiment is not intended to limit the interpretation of the scope of claims of the present invention.

[Embodiment]

Figure 1:
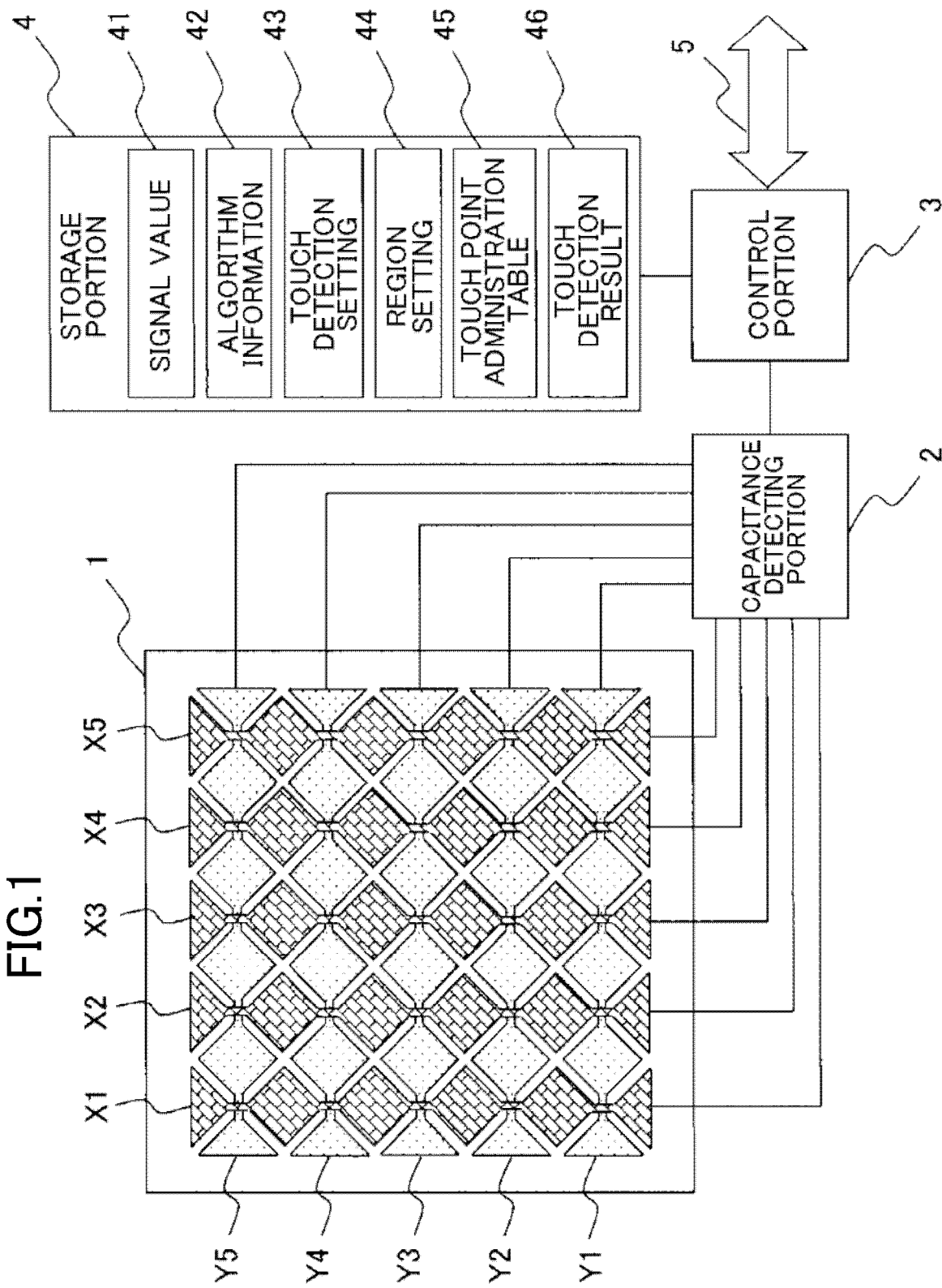
FIG. 1 is a block diagram illustrating an entire schematic structure of a touch panel according to an embodiment of the present invention.

FIG. 1 is a block diagram illustrating an entire schematic structure of a touch panel according to an embodiment of the present invention. The touch panel according to this embodiment includes a touch panel 1, a capacitance detecting portion 2, a control portion 3, a storage portion 4, and a bus connection signal line 5.

An electrode pattern (X electrodes X1 to X5 and Y electrodes Y1 to Y5) as sensor terminals for detecting a touch by a user is formed on the touch panel 1.

The capacitance detecting portion 2 is connected to the respective X electrodes and the respective Y electrodes. The capacitance detecting portion 2 sequentially applies a pulse with the respective X electrodes being transmitter electrodes (drive electrodes) and the respective Y electrodes being receiver electrodes, thereby measuring interelectrode capacitances (mutual capacitances) at respective electrode intersections.

The control portion 3 detects a touch based on the result of measurement of the interelectrode capacitances at the electrode intersections obtained by the capacitance detecting portion 2, and notifies a host device (hereinafter, referred to as host) of the result of the detection via the bus connection signal line 5. Further, the control portion 3 receives a command from the host via the bus connection signal line 5. The control portion 3 may execute a plurality of coordinate calculation algorithms.

The storage portion 4 stores signal values 41, algorithm information 42, a touch detection setting 43, a region setting 44, a touch point administration table 45, and a touch detection result 46 as data for work which are read or written in the process of touch detection processing performed by the control portion 3.

FIG. 2 is a schematic view showing a data structure and an exemplary set of values of the signal values 41 illustrated in FIG. 1. The signal values 41 are two-dimensional array data with the horizontal number of elements being the number of the X electrodes and the vertical number of elements being the number of the Y electrodes. In the following description, an exemplary structure is used having eight X electrodes and twelve Y electrodes.

Each of the signal values is a digital value which indicates the amount of capacitance change at an electrode intersection. A capacitance measurement value, when there is no touch, which is stored in advance is a reference value, and the difference from that value is the signal value. Specifically:

signal value=capacitance measurement value-reference value.

Whether the direction of change in signal value when there is a touch is positive or negative depends on the method of capacitance detection and signal processing. In the following, the signal values are assumed to change in the positive direction when there is a touch.

In FIG. 2, locations at which the value is not "0" means that the capacitance is changed by a touch.

FIG. 3 is a schematic view showing items and an exemplary set of values of the algorithm information 42 illustrated in FIG. 1. The algorithm information 42 stores a list of coordinate calculation algorithms and required times and obtained coordinate precisions when calculation is performed using the coordinate calculation algorithms, respectively. These are values obtained in steps of designing and evaluating the coordinate calculation algorithms.

Generally, there is a tradeoff between required time and coordinate precision in coordinate calculation. In the coordinate calculation, a plurality of signal values are referred, and coordinates of the center of a touch are determined by interpolation processing. In this case, as the number of signal values to be referred to becomes larger and as the interpolation processing performed becomes more complicated, the coordinate precision improves more, but the required time increases accordingly.

The algorithm information 42 stores information of a plurality of kinds of coordinate calculation algorithms. The coordinate calculation algorithms are given required times and coordinate precisions, respectively, by selecting the number of signal values to be referred to and interpolation processing to be used.

FIG. 4 is a schematic view showing items and an exemplary set of values of the touch detection setting 43 illustrated in FIG. 1. The touch detection setting 43 stores a maximum number of touch points and coordinate calculation time as parameters with regard to the entire touch detection processing.

The maximum number of touch points is the number of touch points subjected to the coordinate calculation when there are a plurality of touches simultaneously. The coordinate calculation time is time allowed to perform coordinate calculation processing in the touch detection processing. The coordinate calculation time stored in the touch detection setting 43 defines an upper limit value of time until the coordinate calculation is completed with regard to all the touch points.

These parameters are set at predetermined values (initial values) at the time of power-on. Further, these parameters may be changed at any time by a command from the host.

FIG. 5 is a schematic view showing items and an exemplary set of values of the region setting 44 illustrated in FIG. 1. The region setting 44 stores coordinate precisions in specific regions on a display panel.

The host displays a user interface on the display panel to which the touch panel is attached. When a necessary touch coordinate precision is defined by the kind of the user interface, the host notifies the touch panel of the region and the coordinate precision. The touch panel updates the region setting according to the notified data.

FIG. 6 is a schematic view showing an exemplary user interface. In FIG. 6, an upper portion of a screen of the display panel is a menu region 51 while a lower portion of the screen is a button region 53, and the required touch coordinate precisions are defined with regard to the respective portions. The touch coordinate precision of an ordinary region 52 at the center of the screen is not specifically specified. With regard to such a region whose touch coordinate precision is not specified, the coordinates are determined with the highest possible coordinate precision that the touch panel device may detect. The host notifies the touch panel device of the information. As a result, correspondingly to the user interface shown in FIG. 6, values shown in FIG. 5 are set in the region setting 44.

FIG. 7 is a schematic view showing items of the touch point administration table 45 illustrated in FIG. 1. The touch point administration table 45 is data for work used in the process of the touch detection processing. The respective items are to be described below.

Figure 8:
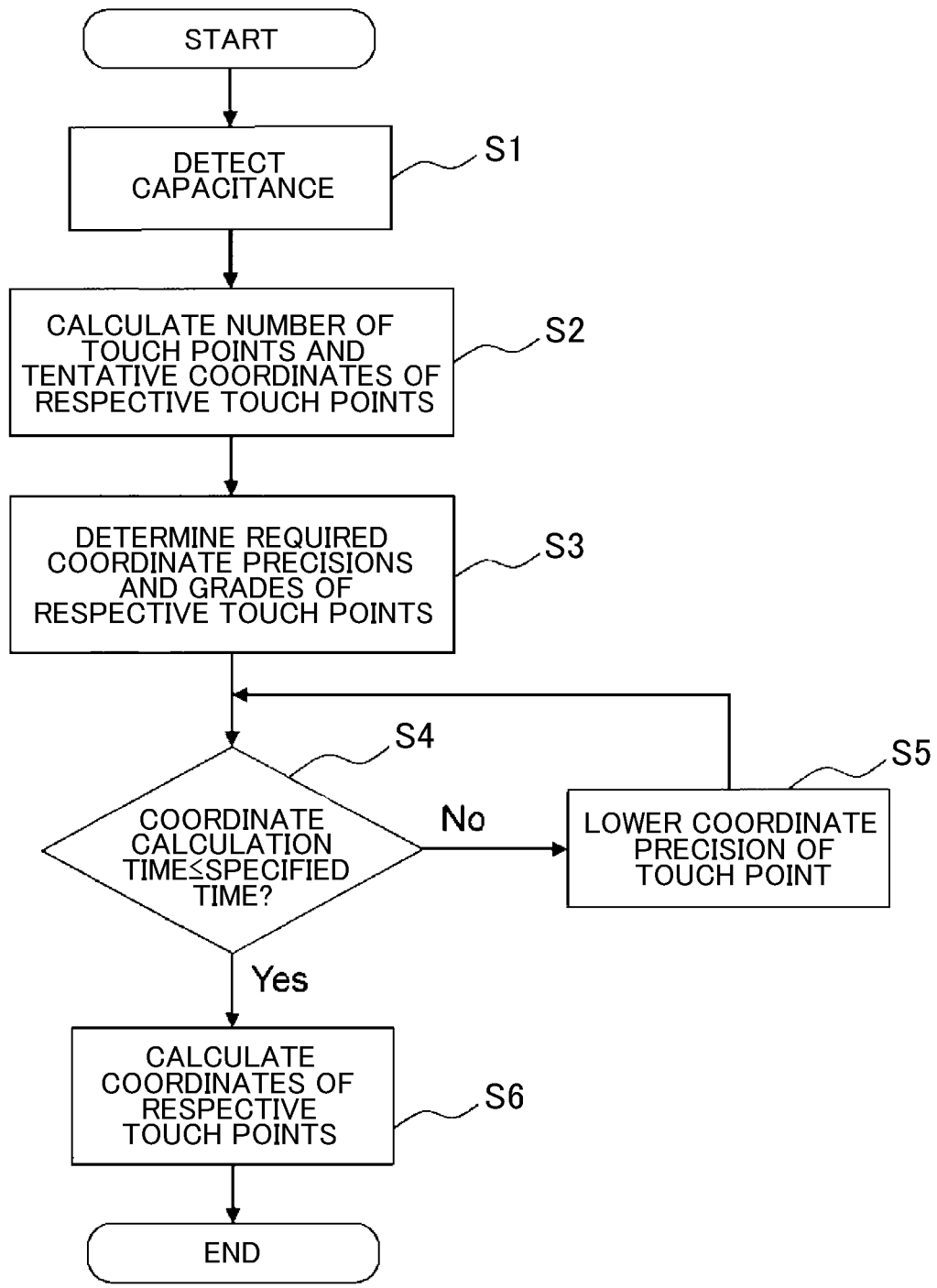
FIG. 8 is a flow chart illustrating a processing procedure of touch detection processing of the touch panel according to the embodiment of the present invention.

FIG. 8 is a flow chart illustrating a processing procedure of the touch detection processing of the touch panel according to the embodiment of the present invention. The touch panel device performs the touch detection processing with the procedure illustrated in FIG. 8 as one cycle.

Figure 9:
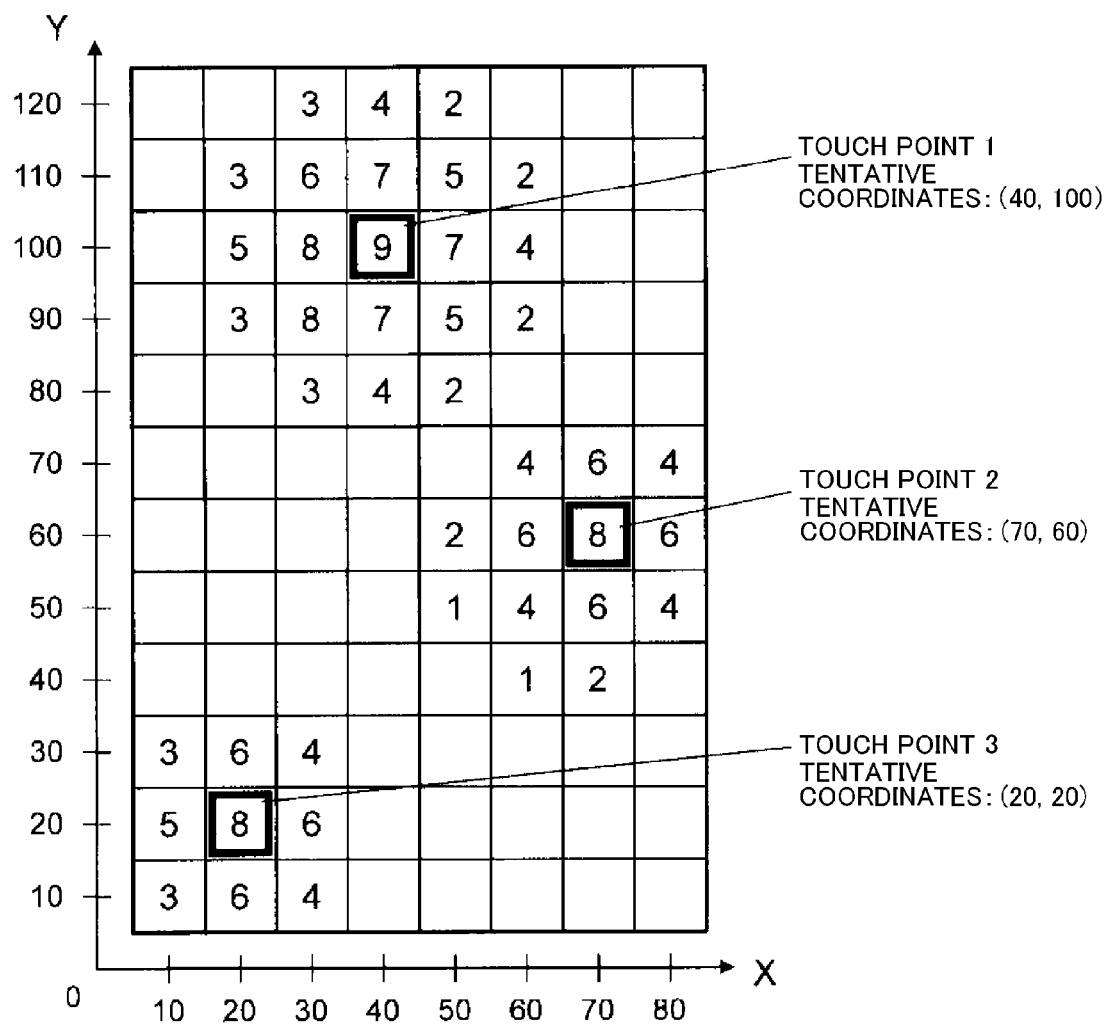
FIG. 9 is a schematic view showing exemplary signal values and detected touch points in the touch panel according to the embodiment of the present invention.

FIG. 9 is a schematic view showing exemplary signal values and detected touch points in the touch panel according to the embodiment of the present invention.

Figure 11:
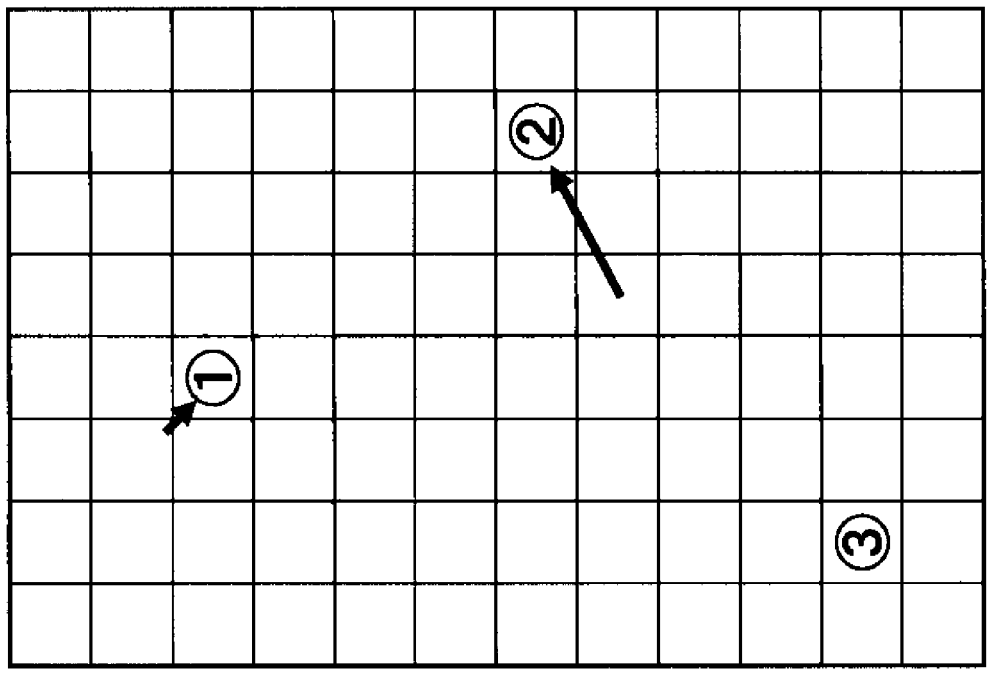
FIG. 11 is a schematic view showing exemplary touch points in the current cycle in the touch panel according to the embodiment of the present invention.
Figure 10:
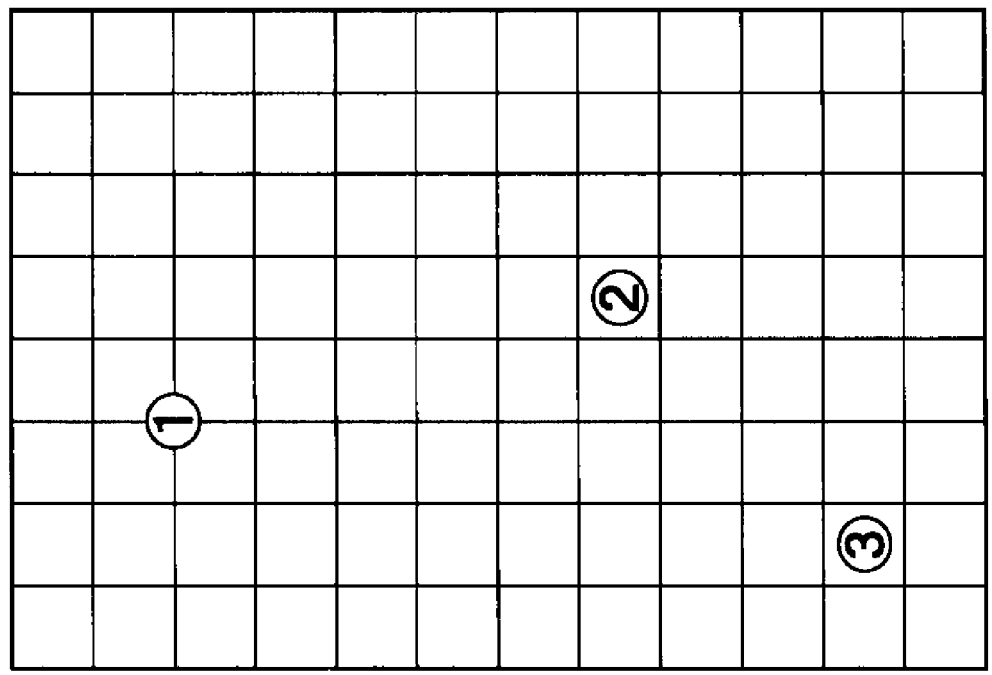
FIG. 10 is a schematic view showing exemplary touch points in the previous cycle in the touch panel according to the embodiment of the present invention.

FIG. 10 is a schematic view showing exemplary touch points in the previous cycle in the touch panel according to the embodiment of the present invention. Further, FIG. 11 is a schematic view illustrating exemplary touch points in the current cycle.

FIG. 12 is a schematic view showing an exemplary touch point administration table in Step S2 in FIG. 8. FIG. 13 is a schematic view showing an exemplary touch point administration table in Step S3 in FIG. 8.

FIG. 14 is a schematic view showing an exemplary touch point administration table in Step S4 in FIG. 8.

FIG. 15 is a schematic view showing an exemplary touch point administration table in Step S5 in FIG. 8.

FIG. 16 is a schematic view showing items and an exemplary set of values of the touch detection result in the touch panel according to the embodiment of the present invention.

Figure 17:
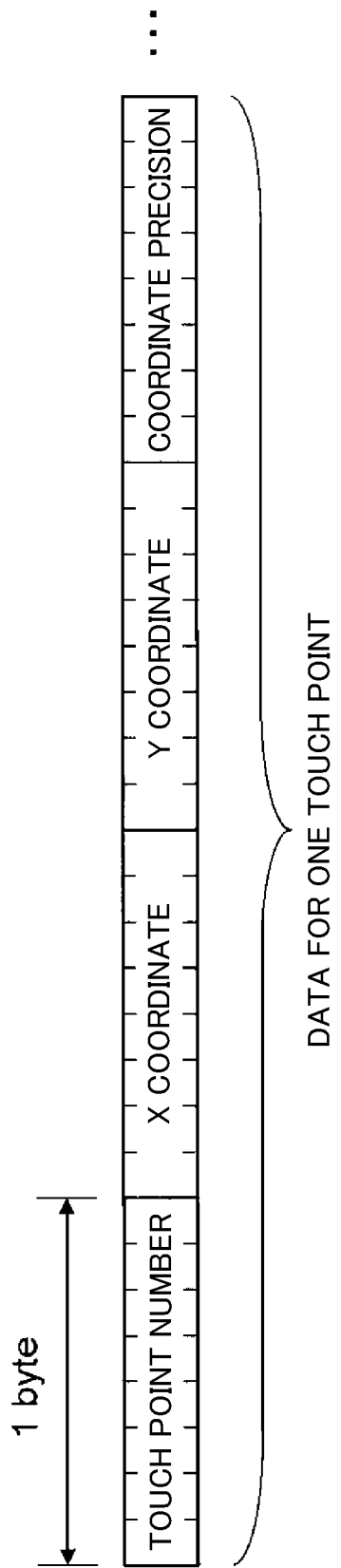
FIG. 17 is a schematic view showing a communication protocol when the content of the touch detection result is transmitted to a host device in the touch panel according to the embodiment of the present invention.

FIG. 17 is a schematic view showing a communication protocol when the content of the touch detection result is transmitted to the host in the touch panel according to the embodiment of the present invention.

In the following, with reference to the flow chart of FIG. 8, the touch detection processing by the control portion 3 is described.

(Step S1: Detect Interelectrode Capacitances (Mutual Capacitances) at Respective Electrode Intersections)

The capacitance detecting portion 2 applies a pulse to the transmitter electrodes (drive electrodes) in turns, and, based on voltage change caused at the receiver electrodes, measures the interelectrode capacitances (mutual capacitances) at the respective electrode intersections. For example, the X electrodes are the transmitter electrodes while the Y electrodes are the receiver electrodes.

FIG. 9 shows an exemplary set of signal values obtained as a result of the capacitance detection. In FIG. 9, at locations where the signal value is "0", the value is not shown.
(Step S2: Calculate Number of Touch Points and Tentative Coordinates of Respective Touch Points)

In this step, the control portion 3 refers to the array data of the signal values, finds a data position corresponding to a local maximum point for each region in which the signal values are not 0, and regards such positions as touch points. A local maximum point is defined as a data position having a value which is equal to or larger than four values around the position (immediately above, immediately below, at the left, and at the right). Note that, when there are a plurality of local maximum points in one region, one among them is regarded as a touch point.

In the process of the processing, when the number of the touch points exceeds the maximum number of touch points stored in the touch detection setting 43, the control portion 3 discontinues the detection of the touch points.

In the example shown in FIG. 9, three touch points are detected. Center positions of electrode intersections corresponding to the respective touch points are set to be tentative coordinates. The result of the above-mentioned processing is stored in the touch point administration table 45. Specifically, touch point numbers "1", "2", and "3" are given to the three touch points, and, as their respective tentative coordinates, (40, 100), (70, 60), and (20, 20) are stored in the touch point administration table 45 (see FIG. 12).
(Step S3: Determine Required Coordinate Precisions and Grades of Respective Touch Points)

In this step, the control portion 3 refers to the region setting 44, and acquires required coordinate precisions corresponding to the tentative coordinates of the respective touch points.

According to the region setting shown in FIG. 5 and the touch point administration table shown in FIG. 12, the required coordinate precision of the touch point 3 is ±5 mm. There is no specification with regard to the touch point 1 and the touch point 2, and thus, the required coordinate precisions of these touch points are set to be the maximum.

Next, the control portion 3 sets a grade with regard to a touch point whose required coordinate precision is the maximum. The grade determines "which of the touch points is given a high coordinate precision preferentially".

Various methods for setting the grade are considered. In this case, a method is described in which "a touch point having a low moving rate is given a high grade". This is based on an empirical rule that "lowered coordinate precision is less conspicuous at a touch point which is moving fast".

The positions of the touch points 1 to 3 in the previous cycle shown in FIG. 10 are coordinates stored in the touch detection result 46. On the other hand, the current positions of the touch points 1 to 3 shown in FIG. 11 are tentative coordinates. By comparing the positions of the touch points at these two times, the moving rates of the respective touch points maybe approximately calculated.

In this example, the touch point 2 moves faster than the touch point 1, and thus, a high grade is given to the touch point 1.

The control portion 3 stores the result of the above-mentioned processing in the touch point administration table 45 (see FIG. 13).

Next, the control portion 3 refers to the algorithm information 42, and selects coordinate calculation algorithms corresponding to the required coordinate precisions of the respective touch points.

Based on the touch point administration table 45 shown in FIG. 13, the precision of the touch point 3 is ±5 mm, and thus, the coordinate calculation algorithm is "C". The precision of the touch point 1 and the touch point 2 is the maximum, and thus, the coordinate calculation algorithm is first "A" corresponding to the highest precision.

The control portion 3 stores the above-mentioned result in the touch point administration table 45 (see FIG. 14).
(Step S4: Determine whether or not Coordinate Calculation Time is within Specified Time)

In this step, the control portion 3 refers to the algorithm information 42 and estimates the coordinate calculation time. When the estimated coordinate calculation time is equal to or shorter than the coordinate calculation time stored in the touch detection setting 43, the processing proceeds to Step S6. When the condition is not satisfied, the processing proceeds to Step S5.

In this example, $$\text{coordinate calculation time} = \sum (\text{required times of coordinate calculation algorithms of } n \text{ touch points})$$
$$= 5 + 5 + 0$$
$$= 10 \text{ ms.}$$

In the above-mentioned example, the calculation time which is required exceeds the specified value 8 ms which is stored in the touch detection setting 43 as the coordinate calculation time, and thus, the processing proceeds to Step S5.
(Step S5: Lower Coordinate Precision of Touch Point)

In this step, the control portion 3 refers to the touch point administration table 45 and lowers the coordinate precision of one of the touch points. Specifically, the control portion 3 changes the coordinate calculation algorithm to one that has shorter required time.

The control portion 3 selects a touch point to which a low grade is given among the touch points whose required coordinate precision is the maximum, as a touch point whose coordinate precision is to be lowered.

In the example described above, the touch point 2 is a target of the processing. The control portion 3 changes the coordinate calculation algorithm of the touch point 2 from "A" to "B", and stores the result in the touch point administration table 45 (see FIG. 15).

The control portion 3 returns to Step S4 and recalculates the coordinate calculation time. According to the recalculation:

$$\text{coordinate calculation time} = \sum (\text{required times of coordinate calculation algorithms of } n \text{ touch points})$$
$$= 5 + 3 + 0$$
$$= 8 \text{ ms.}$$

As a result, the required calculation time is 8 ms, which satisfies the condition of being equal to or shorter than the coordinate calculation time set in the touch detection setting 43.

When the condition is not satisfied, the control portion 3 again proceeds to Step S5 and changes the coordinate calculation algorithm of another touch point.

Note that, even after touch points to which a low grade is given are sequentially selected among the touch points whose required coordinate precision is the maximum and the coordinate calculation algorithms of the touch points are changed, when the coordinate calculation time exceeds the coordinate calculation time of the touch detection setting 43, the control portion 3 also changes the coordinate calculation algorithm of a touch point to which a high grade is given to one that has shorter required time.

When the coordinate calculation time still exceeds the coordinate calculation time stored in the touch detection setting 43, in the above-mentioned method, a touch point whose required coordinate precision is not the maximum becomes a target of the processing of changing the coordinate calculation algorithm thereof. The search for coordinate calculation algorithms which satisfy the condition of being equal to or shorter than the coordinate calculation time set in the touch detection setting 43 may be repeatedly made until, with regard to all the touch points, the coordinate calculation algorithm whose required time is the shortest is set.

(Step S6: Perform Coordinate Calculation of Respective Touch Points Based on Determined Coordinate Calculation Algorithms)

The control portion 3 calculates the coordinates of the respective touch points using the coordinate calculation algorithms which are determined so as to satisfy the condition of being equal to or shorter than the coordinate calculation time set in the touch detection setting 43, and stores the obtained coordinates of the touch points in the touch detection result 46 (see FIG. 16). The coordinate precisions of the coordinate calculation algorithms used for coordinate calculation of the respective touch points are stored as items of the coordinate precisions of the touch detection result 46.

The control portion 3 notifies the content of the touch detection result 46 to the host using a communication protocol shown in FIG. 17. As data for one touch point, the touch point number, the X coordinate of the touch point, the Y coordinate of the touch point, and the coordinate precision are stored in a serial communication data from the touch panel device to the host shown in FIG. 17.

This embodiment has a feature in that coordinate precisions are included in the touch detection result. The host may use this information for user interface processing.

As described above, according to this embodiment, the coordinate calculation algorithms are selected so that the processing is completed within a time limit. Therefore, independently of the number of the touch points, the touch detection is completed within the time limit.

Further, information of the touch points may be acquired in a predetermined cycle, and thus, a highly real-time user interface may be provided.

Further, according to this embodiment, by preparing, as a choice of the coordinate calculation algorithms, one that has very short required time, the maximum number of touch points may be set to have no limitation.

Still further, the maximum number of touch points maybe easily increased, and thus, applications which make use of multiple touches such as multiplayer games may be realized.

An effect obtained by the exemplary embodiment of the invention disclosed herein is briefly described as follows.

According to the present invention, it is possible to provide a touch panel in which, even if the maximum number of touch points is set to be large, touch detection is completed within a specified time.

The invention made by the inventor of the present invention has been specifically described above based on the above-mentioned embodiment, but the present invention is not limited to the embodiment and it should be understood that various modifications are possible within the gist of the present invention.

What is claimed is:

1. A touch panel, comprising:
a plurality of X electrodes;
a plurality of Y electrodes;
a measuring portion for measuring interelectrode capacitances between the plurality of X electrodes and the plurality of Y electrodes;
a storage portion for storing interelectrode capacitance values between the plurality of X electrodes and the plurality of Y electrodes; and
a control portion having a plurality of coordinate calculation algorithms for obtaining different coordinate precisions, for selecting one of the plurality of coordinate calculation algorithms and calculating coordinates of a touch position on the touch panel based on the interelectrode capacitance values stored in the storage portion,
wherein the control portion comprises:
first means for detecting touch points on the touch panel based on the interelectrode capacitance values stored in the storage portion and for determining tentative coordinates of the respective detected touch points;
second means for assigning priorities for being given a high coordinate precision to the respective touch points based on a state of the touch points;
third means for selecting coordinate calculation algorithms corresponding to the priorities assigned by the second means to the respective touch points and for estimating a calculation time necessary for calculating the coordinates of all the touch points detected;
fourth means for determining whether the calculation time estimated by the third means is within a specified time or not;
fifth means for, when the fourth means determines that the calculation time estimated by the third means is not within the specified time, causing the third means to again select coordinate calculation algorithms and estimate the calculation time; and
sixth means for, when the fourth means determines that the calculation time estimated by the third means is within the specified time, selecting, based on the priorities assigned by the second means, coordinate calculation algorithms corresponding to the priorities and for calculating the coordinates of the respective touch points.

2. The touch panel according to claim 1, wherein:
the storage portion includes algorithm information for storing a list of the plurality of coordinate calculation algorithms, required times when calculation is performed using the coordinate calculation algorithms, and obtained coordinate precisions; and
the third means of the control portion refers to the algorithm information, selects the coordinate calculation algorithms corresponding to the priorities, and determines the calculation time necessary for calculating the coordinates of all the touch points.

3. The touch panel according to claim 1, wherein:
the storage portion includes a touch detection setting for storing a maximum number of touch points that is an upper limit of a number of touch points for which coordinate calculation is performed and a coordinate calculation time allowed in touch detection processing when there are a plurality of touches simultaneously;
the first means of the control portion discontinues detection of the touch points when a total number of detected touch points exceeds the maximum number of touch points stored in the touch detection setting; and the fourth means of the control portion uses as the specified time the coordinate calculation time stored in the touch detection setting.

4. The touch panel according to claim 3, wherein the maximum number of touch points and the coordinate calculation time stored in the touch detection setting can be set from outside of the touch panel.

5. The touch panel according to claim 1, wherein:
the storage portion includes a region setting for storing a specific region on the touch panel and coordinate precision required in the specific region; and
the second means of the control portion assigns, as the priority assigned to a touch point in the specific region stored in the region setting, a priority corresponding to the coordinate precision of the specific region.

6. The touch panel according to claim 5, wherein the specific region and the coordinate precision of the specific region stored in the region setting can be set from outside of the touch panel.

7. The touch panel according to claim 1, wherein the second means of the control portion first assigns the priorities for being given a highest coordinate precision to the respective touch points, and, when the second means of the control portion again assigns the priorities to the respective touch points based on a result of the determination by the fourth means, gives a high grade to a specific touch point and gives a low grade to other touch points.

8. The touch panel according to claim 7, wherein, when the second means of the control portion again assigns the priorities to the respective touch points based on the result of the determination by the fourth means, the second means gives a high grade to a touch point having a low moving rate and gives a low grade to a touch point having a high moving rate.

9. The touch panel according to claim 1, wherein:
the storage portion includes a touch point administration table for storing, for each of the touch points detected by the first means of the control portion, tentative coordinates, a required coordinate precision, a grade, and a coordinate calculation algorithm of the each touch point; and
the touch point administration table stores values obtained by the first means and the second means of the control portion as items.

10. The touch panel according to claim 1, wherein:
the storage portion includes a touch detection result for storing, for each of the touch points detected by the first means of the control portion, coordinates and a coordinate precision of the each touch point; and
the touch detection result stores values obtained by the first means and the sixth means of the control portion as items.

11. The touch panel according to claim 1, wherein the control portion notifies outside of the coordinates and the coordinate precision of the touch point for the each of the touch points detected by the first means.

* * * * *